Figure 1:
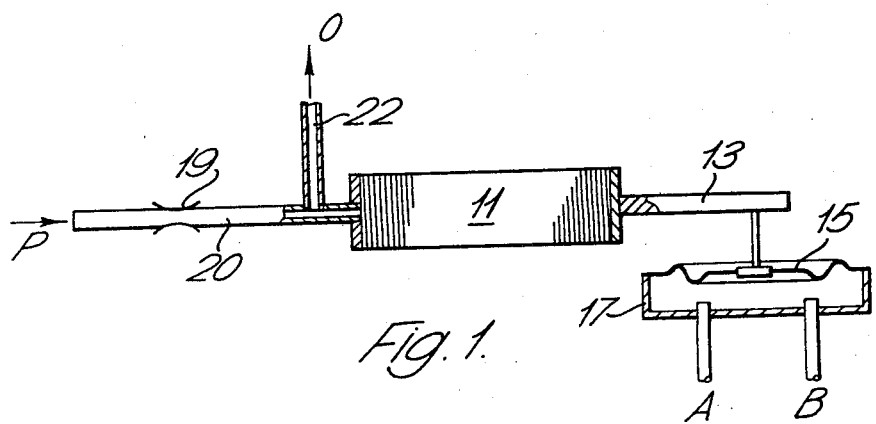

United States Patent

Hales et al.

[15] 3,673,810
[45] July 4, 1972

[54] LIQUID NITROGEN REFRIGERATION SYSTEM

[72] Inventors: Kenneth Calvert Hales; Gerald Robin Scrine, both of Cambridge, England

[73] Assignee: Shipowners Refrigerated Cargo Research Association, Cambridge, England

[22] Filed: Oct. 26, 1970

[21] Appl. No.: 83,722

[30] Foreign Application Priority Data

Oct. 27, 1969 Great Britain......................52,548/69

[52] U.S. Cl....................................62/158, 62/222, 62/514, 137/81.5
[51] Int. Cl.......................................................F25b 41/04
[58] Field of Search..................................62/514, 222–225, 62/158, 216; 137/81.5

[56] References Cited

UNITED STATES PATENTS

| | | | |
|---|---|---|---|
| 3,166,913 | 1/1965 | Carter | 62/514 |
| 3,281,075 | 10/1966 | Smyers | 62/514 |
| 3,526,101 | 9/1970 | Thorburn | 62/223 |

*Primary Examiner*—Meyer Perlin
*Attorney*—Baldwin, Wight & Brown

[57] ABSTRACT

The invention relates generally to apparatus for controlling the pressure of fluid supplied from a pressure source to a valve to open and close the valve for predetermined time intervals, the valve preferably being provided in a pipe leading from a supply of liquid nitrogen to the interior of a refrigerated cargo container to condition the interior of the container by supplying pulses of liquid nitrogen for said predetermined time intervals. The apparatus includes a fluidic logic arrangement in a closed loop with a fluidic delay unit, both the fluidic logic arrangement and the delay unit being powered by said pressure source nitrogen vapor and the fluidic logic arrangement has an output port adapted to be connected to the valve, a starter preferably connected to the pressure source to provide a fluidic pressure output starting signal to the fluidic logic arrangement, after which, in a cycle of operations, said fluidic logic arrangement delivers a fluidic pressure input to the fluidic delay unit and an output at said port for opening the valve, the delay unit causing a fluidic output to be delivered to the input of said fluidic logic arrangement after a predetermined time for closing the valve, which output delivered to the input of the fluidic logic arrangement also automatically resets the apparatus continuously to repeat the cycle.

7 Claims, 7 Drawing Figures

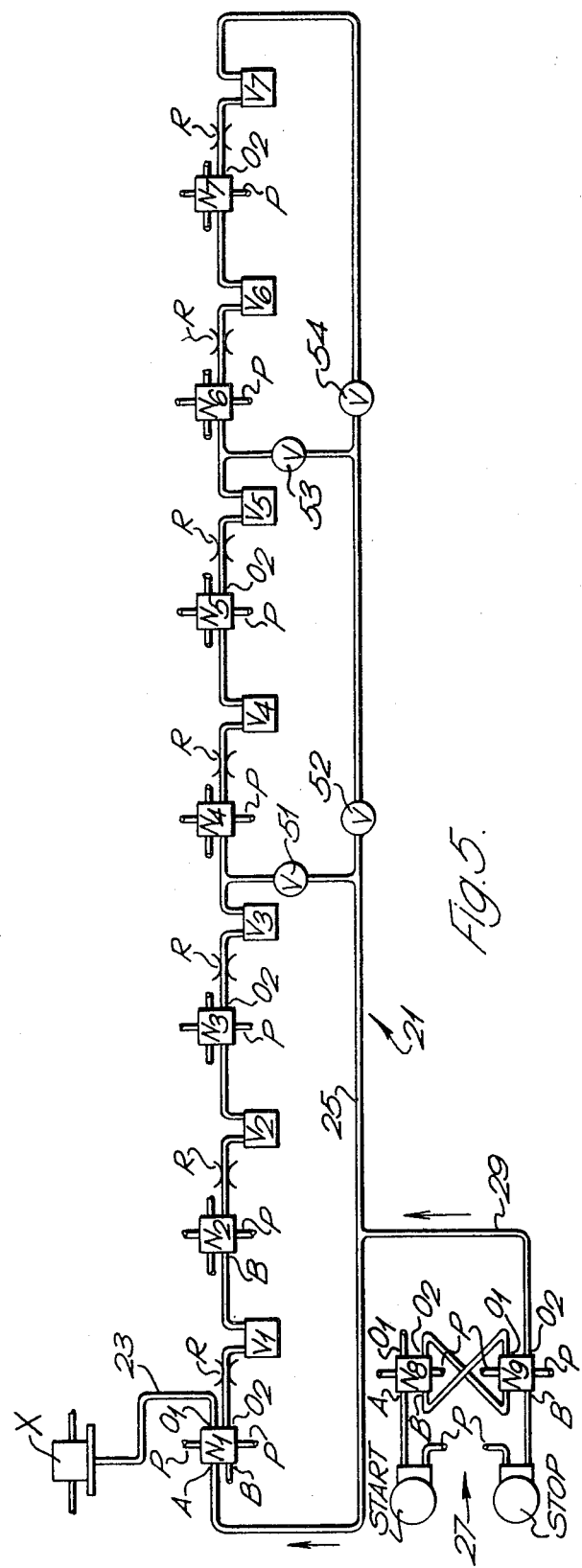

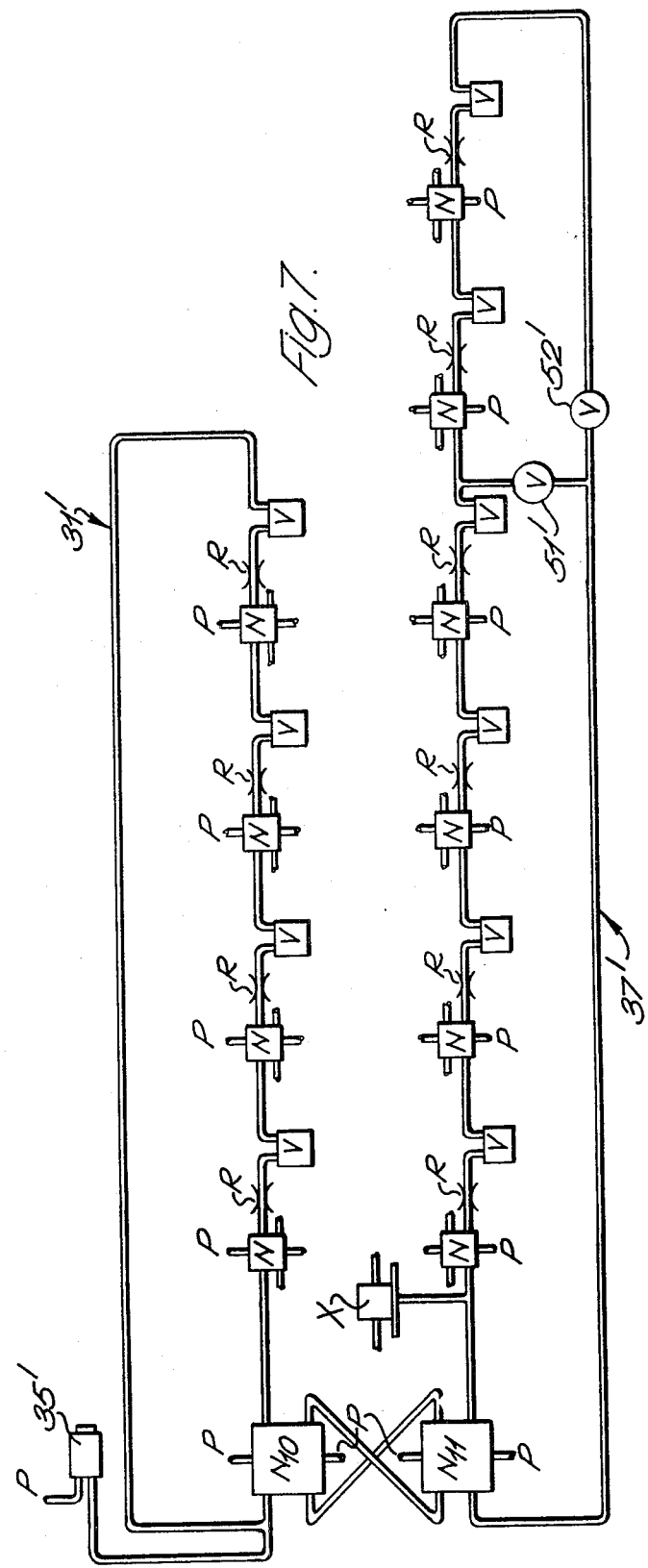

LIQUID NITROGEN REFRIGERATION SYSTEM

This invention relates to fluidic control apparatus for controlling the pressure of fluid supplied from a pressure source to a valve to open and close the valve for predetermined intervals of time. The fluidic control apparatus of the present invention is particularly designed for use with transportable refrigerated cargo containers which are used for the inter-continental transport of commodities where a low temperature and/or low humidity must be maintained inside the container irrespective of wide variations in the external temperature and humidity and notwithstanding handling by different forms of transport. In this respect, the control apparatus is used for admitting, for predetermined time intervals, liquid nitrogen into the container.

It will be appreciated, however, that the fluidic control apparatus can have many other uses such as, for example, the control of pressure fluid to a pneumatically operated machine tool.

According to the broadest aspect of the present invention, we provide apparatus for controlling the pressure of fluid supplied from a pressure source to a valve to open and close the valve for predetermined time intervals, comprising a fluidic logic arrangement in a closed loop with a fluidic delay unit, both the fluidic arrangement and the delay unit being powered by said pressure source, and the fluidic logic arrangement having an output port adapted to be connected to the valve, means connected to the pressure source to provide a fluidic pressure input starting signal to the fluidic logic arrangement, after which, in a cycle of operations, said fluidic logic arrangement delivers a fluidic pressure input to the fluidic delay unit and an output at said port for opening the valve, the delay unit causing a fluidic output to be delivered to the input of said fluidic logic arrangement after a predetermined time for closing the valve, which output delivered to the input of the fluidic logic arrangement also automatically resets the apparatus continuously to repeat the cycle.

The fluidic logic arrangement preferably comprises a NOR unit having a pair of inputs and one or more outputs, the arrangement being such that there is an output only when there is no input. It will be appreciated, however, that it may be possible to use a combination of other known fluid logic elements which give an output signal only when there is no input signal.

According to one embodiment of the invention, the fluidic delay unit comprises an even number of further NOR units arranged in series with the first mentioned NOR unit, each NOR unit being in series with a restrictor and a volume or capacity chamber, and each NOR unit is powered by the pressure source, the arrangement being such that the last volume in the loop is alternately vented, so that there is no input to the first NOR unit, and closed so that a pressure builds up to give an input at the first NOR unit.

To alter the time intervals further pairs of NOR units may be switched into the loop by a multiport valve. Preferably, the fluidic pressure input starting signal is provided by stop/start elements, the stop and start elements being connectable to the pressure source and each having an output connected to an input of a further NOR unit, each of these further NOR units being cross connected to provide a simple flip-flop, whereby there is a continuous output from the flip-flop to the loop until the stop element is operated.

In an alternative embodiment a pair of closed loops are provided, each of the closed loops including a first NOR unit and a fluidic delay unit in series and the two NOR units are cross connected to provide a flip-flop, the arrangement being such that operation of the apparatus is started by applying an input to the NOR unit of one of the loops, whereby due to the cross connection of the NOR units, a fluidic input is maintained at the NOR unit of the said one loop and is delivered to the delay unit of the other loop, and the output connectable to the valve for opening the valve whereby, after said predetermined time interval, said delay unit resets the flip-flop thus conditioning it for closing the valve, and delivering an input to the delay unit of said one loop, which after said predetermined time delay, reconditions the flip-flop automatically to repeat the cycle.

In a preferred arrangement of the alternative embodiment, each of the closed loops is provided with an even number of further NOR units, each having an associated series connected restrictor and volume or capacity chamber and connected in series with the first NOR unit in each loop to provide the fluidic delay unit. As in the first embodiment, a multiport valve may be provided in one or both of the closed loops, so as to alter the time interval be switching into the loop a further even number of NOR units, restrictors and capacity chambers.

Figure 2:
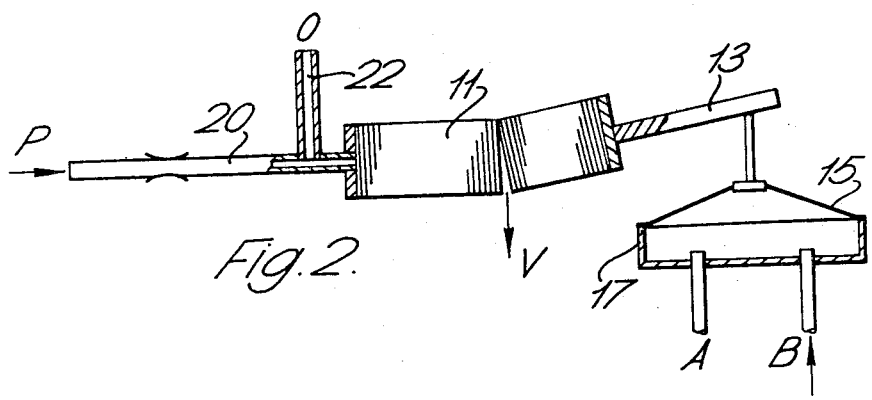
Figure 3:
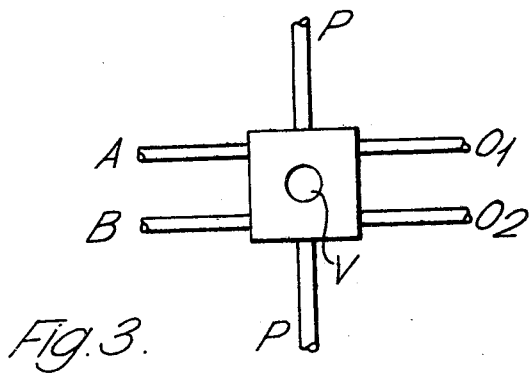
Figure 4:
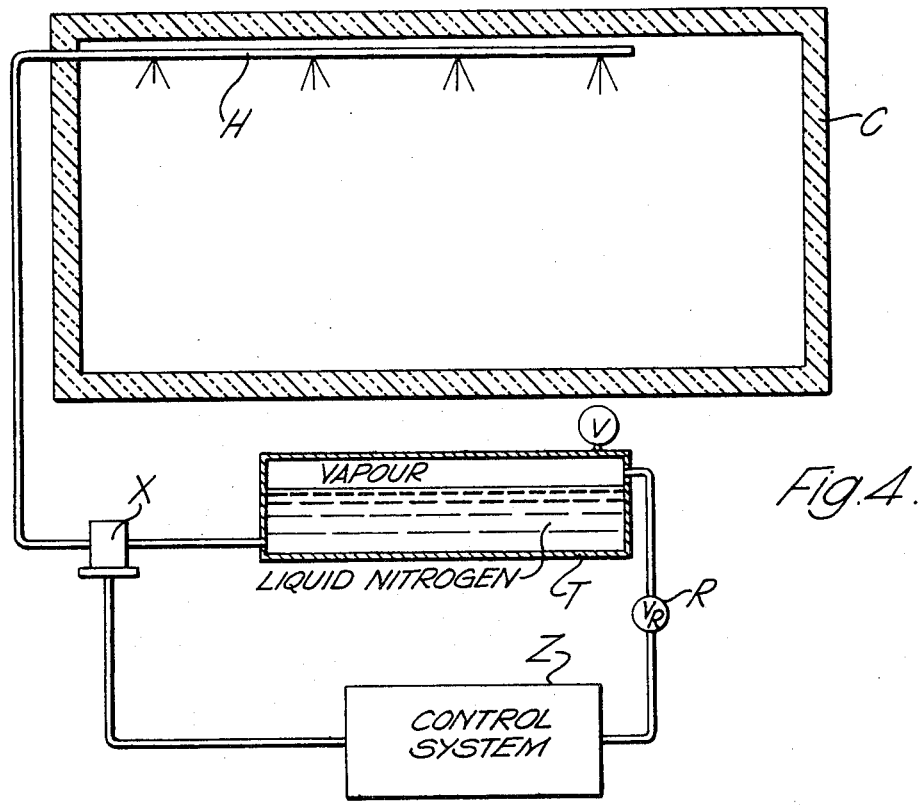
Figure 6:
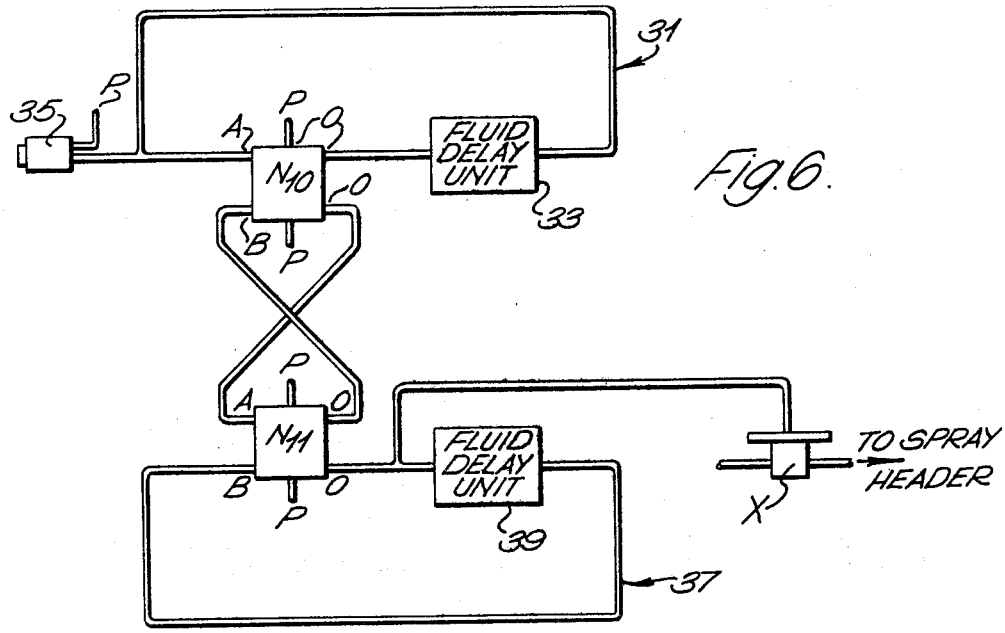

Two embodiments of the invention will now be described with reference to the accompanying drawings in which:

FIG. 1 shows schematically a NOR fluid logic unit under a situation in which there is an output, FIG. 2 shows the NOR unit of FIG. 1 under the condition in which there is no output, FIG. 3 is a more schematic representation of the NOR logic unit of FIGS. 1 and 2, FIG. 4 shows schematically how the control apparatus of the invention is used to control the supply of liquid nitrogen to a container, FIG. 5 shows one embodiment of fluidic control apparatus, FIG. 6 shows generally a second embodiment of fluidic control apparatus, and FIG. 7 shows a particular arrangement of the control apparatus of FIG. 5.

Referring now to the drawings, the control apparatuses of the present invention all make use of NOR fluid logic units. A NOR fluid logic unit is one in which there is a fluidic output only when there is no fluidic input. Two fluidic inputs are provided and the unit may have one or more fluidic outputs. A NOR logic unit which is particularly suitable is one manufactured by the fluidic division of Techne (Cambridge) Limited of Duxford, Cambridge, England. Other makes of NOR fluid logic unit could, however be used. As can be seen from FIGS. 1 and 2, which are purely schematic drawings, the unit incorporates one or more closed coil springs 11 closed at one end in suitable manner and having an arm 13 extending outwardly from it. The arm 13 is connected adjacent its free end to a diaphragm 15 supported in a suitable casing 17. A pair of fluidic pressure input ports A and B communicate with the space defined by the diaphragm 15 and its casing 17. At its other end, the spring 11 is closed by a suitable plate but is in communication, via a pipe 20, with a supply of fluid pressure P passing through a restrictor 19. There is a branch line 22 to the supply line terminating in a fluidic output port 0. Two fluidic output ports 0 may be provided in which case each is provided with and branches from a separate pressure supply P. In the FIG. 1 position, when there is no fluidic pressure input to either of the input ports A or B, the coils of the spring 11 are closed and the supply pressure P passes through the restrictor 19 and gives a fluidic pressure output at the output port 0. Immediately, however, a fluidic input is applied at either or both of the input ports A or B, the diaphragm 15 deflects, causing the coils of the spring 11 to open and the pressure fluid within the spring vents at V with the result that there is no output at the output port 0 because the supply pressure at P, as a result of the restrictor 19, cannot be supplied at a faster rate than the venting at V to give an output at 0. It will thus be appreciated that there is only a fluidic output at 0 if there is no fluidic input at either of the ports A or B.

FIG. 3 merely shows in a more schematic form the NOR fluid logic element of FIGS. 1 and 2 provided with two input ports and hence two separate supplies of pressure fluid P.

The control apparatuses of the present invention are particularly designed for controlling the supply of liquid nitrogen to the interior of a container for transporting refrigerated cargo but it will be appreciated that the apparatuses could be put to any other uses. Referring now to the FIG. 4, a cargo container C is provided with a spray header H which is supplied with liquid nitrogen from a liquid nitrogen source, e.g. a tank T under the control of a pressure controlled valve X. The valve X is controlled by means of a control apparatus Z of the present invention which receives its power via a reducing valve R from the nitrogen vapor in the tank T. Two embodiments of control apparatus Z will now be described with reference to FIGS. 5, 6 and 7.

Referring now to FIG. 5, the control valve X is controlled by a fluidic delay loop indicated generally at 21. The loop 21 includes a first NOR unit $N_1$ having fluidic inputs A and B and fluidic outputs $O_1$ and $O_2$. Power to the NOR unit is supplied through fluid pressure lines P connected directly to the vapor in the liquid nitrogen tank T disclosed in FIG. 4. The output port $O_1$ is connected directly by a fluid pressure line 23 to the control valve X and the output port $O_2$ is connected through a restrictor R to a volume or capacity chamber $V_1$ which in turn is connected to the input B of a further NOR unit $N_2$. The further NOR unit $N_2$ forms one of a pair of units $N_2$, $N_3$ and each further NOR unit is connected in series with a restrictor and a volume or capacity chamber. In the embodiment shown, there are three pairs of further NOR units $N_2$, $N_3$; $N_4$, $N_5$; $N_6$, $N_7$ each of which is provided with a restrictor and volume or capacity chamber.

A multiport valve represented by the valves 51, 52, 53 and 54 is provided in the circuit 21 so that either a single pair or two pairs or three pairs (or more if provided) of further NOR units are included in the circuit. For example, the shortest circuit is with the valve 51 open and valve 52 closed in which case a total of three NOR units will operate. If valves 53 and 52 are open and valves 51 and 54 are closed, five NOR units will operate and likewise if 52 and 54 are open and 51 and 53 closed, seven NOR units will operate. An output O of the last NOR unit $N_3$ in that part of the loop being used (assuming valve 51 is open and valve 52 is closed) is connected, through its restrictor R and volume $V_3$ by a fluid pressure line 25 back to the input A of the first NOR unit $N_1$. The input B of the first NOR unit is blanked off so that there is never an input. As can be seen from the drawing, each of the further NOR units $N_2$ to $N_7$ only makes use of one input port B and one output port $O_2$.

A starter device indicated generally at 27 is connected to the fluid line 25 by a further fluid line 29 and includes a pair of NOR units $N_8$ and $N_9$ cross connected in known manner to provide a simple flip-flop. When the start button is pressed, pressure fluid direct from the vapor above the liquid nitrogen in tank T passes to the input port A of the NOR unit $N_8$ with the result that there is no output from this unit. This means that there is no input to the NOR unit $N_9$ at the input port A and assuming that there is also no input at B, there is an output at each of the outputs $O_1$ and $O_2$ of the NOR unit $N_9$. The output $O_1$ is connected back to the input port B of the unit $N_8$ and so long as there is an output signal in the unit $N_9$, maintains an input signal at the unit $N_8$ so that there is always an output signal. The output from the NOR unit $N_9$ is therefore continuous until the stop button is pressed. This output is delivered down the line 29 and round to the input port A of the first NOR unit $N_1$ in the loop and anticlockwise round the loop, and assuming that the valve 57 is open and the valve 52 is closed, fills up the volume $V_3$ associated with the NOR unit $N_3$. As soon as this volume is full to capacity, a pressure signal is transmitted down the line 25 to the input port A of the NOR unit $N_1$ with the result that there is no output from this NOR unit, thereby causing the control valve X to be turned off. The lack of an output at the output port $O_2$ means that there is no fluidic input to the NOR unit $N_2$ with the result that it delivers an output which fills up the volume $V_2$ associated with the NOR unit $N_2$, whereupon there is an input to the NOR unit $N_3$. This input signal means there is no output signal at the NOR unit $N_3$ but instead, the unit vents its volume $V_3$ with the result that the pressure in the volume $V_3$ and the lines 25 and 29 drops, and there is then no input at the input port A of the first NOR unit $N_1$. With no input at the unit $N_1$, there is an output signal at both of the ports $O_1$ and $O_2$ and so, fluid pressure passes through the passage 23 to the control valve X thereby opening the control valve and putting the liquid nitrogen in the tank T in direct communication with the spray header H to supply liquid nitrogen to the interior of the container to keep the cargo cool. It will now be appreciated that the fluidic output at the $O_2$ port of the first NOR unit $N_1$ then operates the further NOR units $N_2$ and $N_3$ in the loop and after a certain time delay, the volume $V_3$ associated with the NOR unit $N_3$ fills up again, and there is then a fluidic input at the input port A of the first NOR unit $N_1$, which means there is no output, and hence the valve X is closed. Hence the control valve X is held open depending on the length of the loop of NOR units. It will thus be appreciated that the apparatus then automatically re-cycles to open and close the control valve X and produces equal one and off time intervals. To increase the time intervals, the multiport valve is merely operated to bring in one or more further pairs of NOR logic units into the loop 21.

In summary, therefore, it will be appreciated that the valve X controls the flow of liquid nitrogen from the nitrogen tank T to the spray header S inside the container C. The control system 21 is powered by gas pressure from the top of the nitrogen tank via a reducing valve and an output from the first NOR unit of the control system opens the valve X and the lack of an output closes the valve X.

The cycle of operations is initiated by a conventional stop/start system which uses two NOR logic units $N_8$ and $N_9$ cross connected to provide a simple flip-flop and on pressing the start button, the control system is set in motion. After a suitable interval of time determined by the length of the logic loop 21, the valve X is closed and there is then a further time delay before the valve is opened again and the sequence is then automatically repeated. On pressing the stop button, the time sequence is interrupted and no further outputs are delivered to the valve X. In the event of failure of the control system, pressure would build up at the input port A of the first NOR unit $N_1$ and there would then be no output at $O_1$ with the result that the control valve X would close.

The timing sequence of the control system can be varied merely by operating the multiport valve represented by the valves 51, 52, 53 and 54 and hence the timing sequence can be varied according to the ambient temperature surrounding the container. This control could be automated by a system of thermostats controlling the multiport valve.

In an alternative embodiment indicated generally in FIG. 6, the control system consists of a pair of delay loops 31 and 37 each including a NOR unit $N_{10}$, $N_{11}$ and a fluidic delay unit 33, 39 and the two NOR units are cross connected to provide a flip-flop, one of the delay loops being connected to a push button starter 35 and the other being connected to the nitrogen control valve X. The fluidic delay unit 33 is connected to one of the outputs O of the NOR unit $N_{10}$, the output of the fluid delay unit being connected back to one of the inputs A, of the NOR unit $N_{10}$. This input A is also connected to the push button starter mechanism 35. The other output O of the NOR unit $N_{10}$ is cross connected to one of the inputs of the NOR unit $N_{11}$ in the second delay loop 37 and one of the outputs O of the NOR unit $N_{11}$ is cross connected back to the other input B of the NOR unit $N_{10}$. The other output O of the NOR unit $N_{11}$ is connected to the nitrogen control valve X and also to the fluidic delay unit 39, the output of which is connected back to the other input B of the NOR unit $N_{11}$.

In operation, the starter 35 is operated thus delivering an input to the NOR unit $N_{10}$ with the result that there is no output either to the fluidic delay unit or at the other output with the result that there is no input to the first input port A of the NOR unit $N_{11}$. Assuming that there is also no input at the other input port B, there is an output at both of the output ports, thereby maintaining an input at the second input B of the NOR unit $N_{10}$. The other output of the NOR unit $N_{11}$ is delivered to the nitrogen control valve to open it and also to the fluidic delay unit 39 and after a time delay, the fluidic delay unit delivers an input to the other input B of the NOR unit $N_{11}$. This input switches the NOR unit $N_{11}$ so that it no longer gives an output, thereby closing the nitrogen control valve X and also, there is now no output from the other output port, with the result that there is then no input at either of the input ports of the NOR unit $N_{10}$. This then means that there is an output at each of the output ports of the NOR unit $N_{10}$, thereby delivering an input to the fluidic delay unit 33 and also delivering an input to the input A of the NOR unit $N_{11}$ to maintain a lack of output. The delay unit, after a time delay, delivers an input back to the unit $N_{10}$ with the result that there is no output. The sequence is then repeated automatically so that the nitrogen control valve X is switched on and off for equal periods of time.

A particular construction of the embodiment shown in FIG. 6 is shown in FIG. 7 and as can be seen, the two fluidic delay units merely comprise an equal number of NOR units, restrictors and volumes connected in series.

The fluidic delay unit in the loop 37' is similar to the arrangement shown in FIG. 5 and includes a multiport valve system to shorten or lengthen the delay loop as in the FIG. 5 construction. A multiport valve could also be provided in the delay loop 31'. The various NOR units making up the loops 31' and 37' operate in a similar manner to the units in the FIG. 5 embodiment and no further description is considered necessary.

What is claimed is:

1. In combination, a cargo container, a reservoir containing a supply of liquid nitrogen, means including a valve for connecting said reservoir with the interior of said container, and fluidic control apparatus for controlling the supply of nitrogen to said container by opening and closing the valve for predetermined time intervals, said control apparatus comprising a fluidic logic arrangement in a closed loop with a fluidic delay unit, both the fluid logic unit and the delay unit being powered by pressure in the reservoir, means connecting an output of the fluidic logic arrangement to said valve, a starter powered from the nitrogen reservoir to provide a fluidic pressure starting signal to the fluidic logic arrangement, whereby in a cycle of operations, said fluidic logic arrangement delivers an input to said delay unit and opens said valve, said delay unit causing an input to be delivered to said fluidic logic arrangement after a predetermined time, thereby closing the valve, and also automatically resetting the control apparatus to repeat the cycle.

2. A combination according to claim 1, in which the control apparatus includes a pair of closed loops each provided with a NOR unit and a fluidic delay unit in series, the two NOR units being cross connected to provide a flip-flop and operation of the apparatus being started by application of an input to the NOR unit of one of the loops whereby, due to the cross connection of the NOR units, a fluid input is maintained at the NOR unit of the said one loop and is delivered to the delay unit of the other loop and to the output connectable to the valve for opening the valve whereby, after said predetermined time interval, said delay unit resets the flip-flop, thus closing the valve, and deliverinG an input to the delay unit of said one loop, which after said predetermined time delay, reconditions the flip-flop automatically to repeat the cycle.

3. A combination according to claim 2, in which each of the closed loops is provided with an even number of further NOR units, each having an associated series connected restrictor and volume and connected in series with the first NOR unit in each loop to provide the fluidic delay unit.

4. A combination according to claim 3, in which a multiport valve is provided in at least one of the closed loops, so as to alter the time interval by switching into the said at least one loop a further even number of NOR units, restrictors and volumes.

5. A combination according to claim 1, in which the fluid logic arrangement comprises a NOR unit and the fluidic delay unit comprises an even number of further NOR units arranged in series with the fluidic logic arrangement, each NOR unit being in series with a restrictor and a volume and each NOR unit being powered by the pressure source, the arrangement being such that the last volume in the loop is alternately vented so that there is no input to the fluidic logic arrangement and closed so that a pressure builds up to give an input to the fluidic logic arrangement.

6. A combination according to claim 5, including further pairs of NOR units and a multiport valve for switching said further pairs of NOR units into the loop to alter the time intervals.

7. A combination according to claim 1, in which the fluidic pressure input starting signal is provided by stop/start elements, the stop and start elements being connectable to the reservoir and each having outputs connected to an input of a further NOR unit, each of these further NOR units being cross connected to provide a simple flip-flop, whereby there is a continuous output from the flip-flop to the loop until the stop element is operated.

* * * * *